United States Patent Office 2,811,537
Patented Oct. 29, 1957

2,811,537

Δ⁴,⁸⁽⁹⁾-3,11,20-TRIKETO-17-HYDROXY-21-ACYLOXY-PREGNADIENE

George Krsek, Danville, and George G. Hazen, Northumberland, Pa., assignors to Merck & Co., Inc., Rahway, N. J., a corporation of New Jersey No Drawing. Application January 25, 1955,
Serial No. 483,859

5 Claims. (Cl. 260—397.45)

This invention is concerned generally with novel steroid compounds and processes of preparing them. More particularly, it relates to $\Delta^{4,8(9)}$ - 3,11,20 - triketo - 17 - hydroxy - 21 - oxygenated - pregnadiene compounds, and with processes for preparing these novel $\Delta^{4,8(9)}$ - 3,11,20-triketo - 17 - hydroxy - 21 - oxygenated - pregnadiene compounds. These new compounds possess pharmacological activity similar to that shown by cortisone and are thus of value in the treatment of arthritis and related diseases. Moreover, in addition to possessing cortisone-activity, these $\Delta^{4,8(9)}$ - 3,11,20 - triketo - 17 - hydroxy - 21-oxygenated - pregnadienes differ from cortisone in being relatively free from undesired side effects such as sodium or water retention action.

These $\Delta^{4,8(9)}$ - 3,11,20 - triketo - 17 - hydroxy - 21-oxygenated - pregnadiene compounds, subject of the present invention, may be chemically represented as follows:

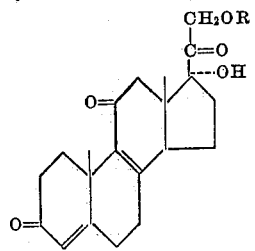

wherein R is hydrogen or an acyl radical.

The $\Delta^{4,8(9)}$ - 3,11,20 - triketo - 17 - hydroxy - 21 - oxygenated - pregnadienes are prepared by reacting $\Delta^4$ - 9-bromo - 3,11,20 - triketo - 17 - hydroxy - 21 - acyloxy-pregnene with collidine to form the corresponding $\Delta^{4,8(9)}$-3,11,20 - triketo - 17 - hydroxy - 21 - acyloxy - pregnadiene which, upon reaction with a hydrolyzing agent, is converted to $\Delta^{4,8(9)}$ - 3,11,20 - triketo - 17,21 - dihydroxy-pregnadiene.

The $\Delta^4$ - 9 - bromo - 3,11,20 - triketo - 17 - hydroxy-21 - acyloxy - pregnene compounds utilized as starting materials can be prepared by reacting 9 - bromo - cortisone with the appropriate acylating agent preferably a carboxylic acid anhydride such as a lower alkanoic acid anhydride, as for example acetic anhydride, propionic anhydride, benzoic anhydride and the like, in the presence of a tertiary amine such as pyridine. The $\Delta^4$ - 9 - bromo-3,11,20 - triketo - 17 - hydroxy - 21 - acyloxy - pregnene compounds obtained in accordance with this method include $\Delta^4$ - 9 - bromo - 3,11,20 - triketo - 17 - hydroxy-21 - acetoxy - pregnene, $\Delta^4$ - 9 - bromo - 3,11,20 - triketo-17 - hydroxy - 21 - propionoxy - pregnene, $\Delta^4$ - 9 - bromo-3,11,20 - triketo - 17 - hydroxy - 21 - benzoxy - pregnene, and the like.

The reaction between the $\Delta^4$ - 9 - bromo - 3,11,20-triketo - 17 - hydroxy - 21 - acyloxy - pregnene and collidine, or other tertiary amines such as pyridine, is conveniently conducted by heating the reactants together under reflux for a period of about one-half to one hour; the resulting mixture may be allowed to stand for an additional period at room temperature if desired. The reaction mixture is then diluted with water and the precipitated material is recovered by filtering the aqueous slurry; the solid material is washed with water and dried and conveniently purified by recrystallization from an organic solvent such as acetone to give the corresponding $\Delta^{4,8(9)}$ - 3,11,20 - triketo - 17 - hydroxy - 21 - acyloxy-pregnadiene as for example $\Delta^{4,8(9)}$ - 3,11,20 - triketo - 17-hydroxy - 21 - acetoxy - pregnadiene, $\Delta^{4,8(9)}$ - 3,11,20-triketo - 17 - hydroxy - 21 - propionoxy - pregnadiene, $\Delta^{4,8(9)}$ - 3,11,20, - triketo - 17 - hydroxy - 21 - benzoxy-pregnadiene, and the like.

The latter $\Delta^{4,8(9)}$ - 3,11,20 - triketo - 17 - hydroxy - 21-acyloxy - pregnadienes are conveniently hydrolyzed by reaction with an alkali metal alkoxide such as sodium methoxide in a lower alkanol such as methanol. The hydrolysis reaction is conveniently conducted at room temperature or above to give $\Delta^{4,8(9)}$ - 3,11,20 - triketo - 17, 21 - dihydroxy - pregnadiene which can be recovered from the hydrolysis reaction mixture by diluting it with water and filtering the precipitated material.

Alternatively, instead of utilizing a $\Delta^4$ - 9 - bromo - 3,11, 20 - triketo - 17 - hydroxy - 21 - acyloxy - pregnene as starting material, we can employ a $\Delta^{8(9)}$ - 4 - bromo - 3, 11,20 - triketo - 17 - hydroxy - 21 - acyloxy - pregnene such as $\Delta^{8(9)}$ - 4 - bromo - 3,11,20 - triketo - 17 - hydroxy-21 - acetoxy - pregnene, and the like. When this compound is reacted with a dehydrohalogenating agent such as collidine or semicarbazide, there is obtained the corresponding $\Delta^{4,8(9)}$ - 3,11,20 - triketo - 17 - hydroxy - 21-acyloxy - pregnadiene.

Instead of utilizing the $\Delta^{8(9)}$ - 4 - bromo - 3,11,20-triketo - 17 - hydroxy - 21 - acyloxy - pregnenes or $\Delta^4$ - 9 - bromo - 3,11,20 - triketo - 17 - hydroxy - 21-acyloxy - pregnenes as starting materials, we can also use a 4,9 - dibromo - 3,11,20 - triketo - 17 - hydroxy - 21-acyloxy - pregnane such as 4,9 - dibromo - 3,11,20 - triketo - 17 - hydroxy - 21 - acetoxy - pregnane, and the like. When this compound is reacted with a dehydrohalogenating agent such as collidine, there is obtained the corresponding $\Delta^{4,8(9)}$ - 3,11,20 - triketo - 17 - hydroxy-21 - acyloxy - pregnadiene.

The following examples illustrate methods of carrying out the present invention, but it is to be understood that these examples are given for purposes of illustration and not of limitation.

Example 1

19.2 g. of dry 9α - bromo - $\Delta^4$ - pregnene - 17,21 - diol-3,11,20 - trione 21 - acetate is heated at reflux with 100 ml. of collidine for one-half hour. The mixture is allowed to cool to room temperature and stand overnight at that temperature. To the slurry is added 100 ml. of water, and the precipitated material is recovered by filtration, washed with 2×100 ml. of water, and air-dried. This material is recrystallized from 75 ml. of acetone to give $\Delta^{8,(9)}$ - pregnene - 17,21 - diol - 3,11,20 - trione 21-acetate, M. P. 238–240° C.

This material is hydrolyzed by reaction with sodium methoxide in methanol to form $\Delta^{8,(9)}$ - pregnene - 17,21-diol - 3,11,20 - trione 21 - acetate.

Example 2

A mixture of 0.43 g. of 4 - bromo - $\Delta^{8(9)}$ - pregnene-17,21 - diol - 3,11,20 - trione 21 - acetate, 0.18 g. of semicarbazide, in 0.7 ml. of dimethylformamide and 8.4 ml. of chloroform is heated under reflux for forty-five minutes. One milliliter of water is added and the mixture is heated under reflux for an additional ten minutes. To this solution is added 15 ml. of 1.4 N aqueous hydrochloric acid, and the resulting mixture is heated under reflux for one and one-half hour. The chloroform layer is separated and retreated with 1.4 N aqueous hydrochloric acid as above. The chloroform layer is separated and evaporated to dryness in vacuo, and the residual material is recrystallized from ethyl ether-acetone to give $\Delta^{4,8(9)}$ - pregnadiene - 17,21 - diol - 3,11,20 - trione 21-acetate; M. P. 238° C.

The 4 - bromo - $\Delta^{8(9)}$ - pregnene - 17,21 - diol - 3,11,20-trione 21-acetate utilized as starting material in this example may be prepared from pregnane - 3,17 - diol - 11,20-dione in accordance with the following procedure:

50 g. of pregnane - 3,17 - diol - 11,20 - dione is dissolved in 1000 ml. of chloroform and to the solution is added dropwise with stirring over a forty-minute period, 200 ml. of chloroform containing 15 ml. of liquid bromine, while maintaining the temperature of the mixture at about room temperature. After the reaction is complete, the solution is washed free of acid with aqueous sodium bicarbonate solution and the washed chloroform solution is evaporated to dryness in vacuo. The resulting semicrystalline oil is reacted with potassium acetate and sodium iodide in acetone solution, and the reaction solution is diluted with water and the acetone is evaporated from the aqueous mixture in vacuo. The resulting slurry is filtered and the filtered material is washed with water and dried to give a mixture of $\Delta^{8(9)}$ - pregnene - 3,17,21-triol - 11,20 - dione 21 - acetate and pregnane - 3,17,21-triol - 11,20 - dione 21 - acetate.

A mixture of 30 g. of $\Delta^{8(9)}$ - pregnene - 3,17,21 - triol-11,20 - dione 21 - acetate and pregnane - 3,17,21 - triol-11,20 - dione 21 - acetate (prepared as described hereinabove), 130 ml. of a solution of N-bromoacetamide-methanol, 360 ml. of methanol and 5.5 ml. of pyridine is stirred for 16 hours at 25° C. Eight milliliters of allylalcohol is added to the reaction mixture to quench the excess N-bromoacetamide. To the resulting mixture is added 2500 ml. of water, and the precipitated material is recovered by filtration, washed with 3×250 ml. of water, and dried. This material is dissolved in acetic acid, cooled, the crystalline material which precipitates (pregnane - 17,21 - diol - 3,11,20 - trione 21 - acetate) is removed by filtration and the mother liquors is mixed with 500 ml. of chloroform and 300 ml. of water. The chloroform layer is separated and washed free of acid with more water. The washed chloroform solution is evaporated to dryness, and the residual material is recrystallized from 20 ml. of ethyl acetate to give $\Delta^{8,(9)}$ - pregnene - 17,21 - diol - 3,11,20 - trione 21 - acetate; M. P. 215° C.

To a solution of 0.9 g. of $\Delta^{8(9)}$ - pregnene - 17,21-diol - 3,11,20 - trione 21 - acetate in chloroform and glacial acetic acid is added dropwise with stirring a solution of 0.34 g. of bromine in glacial acetic acid. To the bromination mixture is added 0.4 g. of sodium acetate dissolved in 2.7 ml. of water. The chloroform is evaporated from the resulting mixture in vacuo, and 18 ml. of water is added to the resulting slurry. The crystalline material which separates is recovered by filtration and dried to give 4 - bromo - $\Delta^{8(9)}$ - pregnene - 17,21 - diol - 3,11,20-trione 21-acetate.

Various changes and modifications may be made in carrying out the present invention without departing from the spirit and scope thereof. Insofar as these changes and modifications are within the purview of the annexed claims, they are to be considered as part of this invention.

We claim:

1. The process which comprises reacting a 4 - bromo-steroid selected from the group which consists of $\Delta^{8(9)}$-4 - bromo - 3,11,20 - triketo - 17 - hydroxy - 21 - (lower alkanoyloxy) - pregnene and 4,9 - dibromo - 3,11,20-triketo - 17 - hydroxy - 21 - (lower alkanoyloxy) - pregnane with a dehydrohalogenating agent selected from the group which consists of tertiary amines and semicarbazide to produce the corresponding $\Delta^{4,8(9)}$ - 3,11,20 - triketo-17 - hydroxy - 21 - (lower alkanoyloxy) - pregnadiene.

2. The process which comprises reacting a $\Delta^{8(9)}$ - 4-bromo - 3,11,20 - triketo - 17 - hydroxy - 21 - (lower alkanoyloxy) pregnene with a dehydrohalogenating agent selected from the group which consists of tertiary amines and semicarbazide thereby forming the corresponding $\Delta^{4,8(9)}$ - 3,11,20 - triketo - 17 - hydroxy - 21 - (lower alkanoyloxy) pregnadiene.

3. The process which comprises reacting $\Delta^{8(9)}$ - 4-bromo - 3,11,20 - triketo - 17 - hydroxy - 21 - acetoxy-pregnene with collidine to produce $\Delta^{4,8(9)}$ - 3,11,20-triketo - 17 - hydroxy - 21 - acetoxy - pregnadiene.

4. The process which comprises reacting 4,9 - dibromo-3,11,20 - triketo - 17 - hydroxy - 21 - (lower alkanoyloxy)-pregnane with a dehydrohalogenating agent selected from the group which consists of tertiary amines and semicarbazide thereby forming the corresponding $\Delta^{4,8(9)}$ - 3,11,20-triketo - 17 - hydroxy - 21 - (lower alkanoyloxy) pregnadiene.

5. The process which comprises reacting 4,9 - dibromo-3,11,20-triketo - 17 - hydroxy - 21 - acetoxy - pregnane with collidine to produce $\Delta^{4,8(9)}$ - 3,11,20 - triketo - 17-hydroxy - 21 - acetoxy - pregnadiene.

References Cited in the file of this patent

UNITED STATES PATENTS

| 2,409,798 | Reichstein | Oct. 22, 1946 |
| 2,617,812 | Wilson | Nov. 11, 1952 |
| 2,645,666 | Hogg | July 14, 1953 |
| 2,655,516 | Levin | Oct. 13, 1953 |

FOREIGN PATENTS

| 245,270 | Switzerland | July 1, 1947 |

OTHER REFERENCES

Butenandt: Ber. 72, 1617–23 (1939).
Inhoffen: Ber. 73, 451–7 (1940).
Fieser et al.: Natural Products Related to Phenanthrene, 3rd ed., pages 465–470 (1949).